(12) United States Patent
Matsuoka

(10) Patent No.: US 8,386,926 B1
(45) Date of Patent: Feb. 26, 2013

(54) NETWORK-BASED CUSTOM DICTIONARY, AUTO-CORRECTION AND TEXT ENTRY PREFERENCES

(75) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,723

(22) Filed: Oct. 6, 2011

(51) Int. Cl.
*G06N 3/00* (2006.01)
(52) U.S. Cl. .................. 715/256; 715/257; 715/259
(58) Field of Classification Search .................. 715/234, 715/243, 254, 255, 257, 256, 259
See application file for complete search history.

(56) References Cited

U.S. PATENT DOCUMENTS

| | | | | |
|---|---|---|---|---|
| 6,862,612 | B1 * | 3/2005 | Horn et al. ..................... | 709/219 |
| 2006/0149557 | A1 * | 7/2006 | Kaneko et al. ................. | 704/277 |
| 2007/0061131 | A1 * | 3/2007 | Kida et al. ...................... | 704/10 |
| 2007/0067157 | A1 * | 3/2007 | Kaku et al. ...................... | 704/10 |
| 2007/0271089 | A1 * | 11/2007 | Bates et al. ..................... | 704/9 |
| 2008/0307061 | A1 * | 12/2008 | Jacovi et al. ................... | 709/206 |
| 2010/0250239 | A1 * | 9/2010 | Itakura ............................ | 704/10 |
| 2011/0055912 | A1 * | 3/2011 | Fusari et al. ..................... | 726/8 |
| 2011/0138446 | A1 * | 6/2011 | Barrett et al. .................... | 726/3 |
| 2012/0102153 | A1 * | 4/2012 | Kemp et al. .................... | 709/219 |

FOREIGN PATENT DOCUMENTS
WO 2010/111146 A2 9/2010

OTHER PUBLICATIONS

Mohn, "Custom Dictionary Syncronization with Dropbox", vNinja. net, Mar. 13, 2011, 5 pages.
Search Report and Written Opinion for PCT/US2012/054854, mailed Nov. 28, 2012, 16 pages.
Adams, "Check Spelling in Google Spreadsheets", retrieved on Dec. 13, 2012 from http://googledocs.blogspot.com/2010/08/check-spelling-in-google-spreadsheets.html, Aug. 18, 2010, 4 pages.

* cited by examiner

*Primary Examiner* — Kyle Stork
(74) *Attorney, Agent, or Firm* — Brake Hughes Bellermann LLP

(57) ABSTRACT

Methods and apparatus for implementing network-based text-entry preferences are disclosed. An example method includes receiving, at a server, a valid login request from a user for an account maintained on the server and identifying, on the server, a set of text-entry preferences associated with the account. The example method further includes receiving, at the server, a request from the user to execute a first network-based application on the server and receiving, at the server, user-entered text associated with the first network-based application. The example method still further includes applying, by the server, the set of text-entry preferences to the received user-entered text and providing, after applying the set of text-entry preferences, the received user-entered text to the first network-based application.

26 Claims, 10 Drawing Sheets

US 8,386,926 B1

NETWORK-BASED CUSTOM DICTIONARY, AUTO-CORRECTION AND TEXT ENTRY PREFERENCES

TECHNICAL FIELD

This document relates, generally, to network-based approaches for implementing custom user preferences.

BACKGROUND

Computing devices and applications that run on such computing devices continue to advance. For instance, computing devices and/or applications often include features that are designed to assist users of computing devices when using the computing devices and/or applications. For example, such features may include custom spelling preferences (e.g., custom dictionaries), custom text entry preferences (e.g., custom abbreviation expansions and/or custom capitalization preferences) and lists of commonly used terms that may be used to provide auto-complete suggestions to a user of a particular computing device. Currently, however these features are specific to each computing device and/or each application. Because computing device users often use multiple computing devices and multiple applications, such approaches are inconvenient as these users must take the time to create such custom preferences for each computing device and/or application they use.

SUMMARY

In a general aspect, a computer-implemented method includes receiving, at a server, a valid login request from a user for an account maintained on the server and identifying, on the server, a set of text-entry preferences associated with the account. The example method further includes receiving, at the server, a request from the user to execute a first network-based application on the server and receiving, at the server, user-entered text associated with the first network-based application. The example method still further includes applying, by the server, the set of text-entry preferences to the received user-entered text and providing, after applying the set of text-entry preferences, the received user-entered text to the first network-based application.

Implementations may include one or more of the following features. For example, the method may also include receiving, at the server, a request from the user to execute a second network-based application on the server, the second network application being different than the first network-based application and receiving, at the server, user-entered text associated with the second network-based application. The method may still further include applying, by the server, the set of text-entry preferences to the received user-entered text associated with the second network-based application and providing, after applying the set of text-entry preferences, the received user-entered text associated with the second network-based application to the second network-based application.

The set of text-entry preferences of the method may be included in one of a table and a database. Applying the set of text-entry preferences may include comparing, with the received user-entered text, one or more user-defined spelling preferences included in the set of text-entry preferences and noting the received user-entered text to indicate one or more words in the received user-entered text that, based on the comparison with the user-defined spelling preferences, have respective matches in the user-defined spelling preferences. Noting the received user-entered text may comprise modifying the received user-entered text to indicate the respective matches. Noting the received user-entered text may comprise generating metadata corresponding with the user-entered text, the metadata indicating the respective matches, where the metadata is provided to the first network-based application with the user-entered text.

Applying the set of text-entry preferences may also include comparing, with the received user-entered text, one or more user-defined abbreviation expansion preferences included in the set of text-entry preferences and modifying the received user-entered text to expand one or more abbreviations in the received user-entered text that, based on the comparison with the user-defined abbreviation expansion preferences, have respective matches in the user-defined abbreviation expansion preferences. Applying the set of text-entry preferences may also include comparing, with the received user-entered text, one or more user-defined capitalization preferences included in the set of text-entry preferences and noting the received user-entered text to indicate one or more words in the received user-entered text that, based on the comparison with the user-defined capitalization preferences, have respective matches in the user-defined capitalization preferences.

The valid login request may be received from a first computing device via a data network. The method may further include receiving, at the server from a second computing device, a second valid login request from the user for the account and identifying, on the server, the set of text-entry preferences associated with the account. The method may still further include receiving, at the server, a request from the user to execute a second network-based application on the server and receiving, at the server from the second computing device, user-entered text associated with the second network-based application. The method may also include applying, by the server, the set of text-entry preferences to the received user-entered text associated with the second network-based application and providing, after applying the set of text-entry preferences, the received user-entered text associated with the second network-based application to the second network-based application. The first network-based application and the second network-based application may be the same network-based application.

The server may include a plurality of network servers including a login server and an application server, the login server being configured to receive the valid login request and the application server being configured to receive the request to execute the first network-based application, receive the user-entered text and apply the set of text-entry preferences to the user-entered text. The set of text-entry preferences may be located on the login sever. The set of text-entry preferences may be located on the application server.

In another general aspect, a computer-implemented method includes sending, to a server from a first computing device, a valid login request from a user for an account maintained on the server and receiving, from the server, a set of text-entry preferences associated with the account. The method further includes sending, to the server, a request from the user to execute a first network-based application on the server and receiving, by the first computing device, user-entered text associated with the first network-based application. The method further includes applying, by the first computing device, the set of text-entry preferences to the user-entered text and sending, after applying the set of text-entry preferences, the user-entered text to the server.

Implementations may include one or more of the following features. For example, the method may include sending, to the server from the first computing device, a request from the user to execute a second network-based application on the server. The second network application may be different than the first network-based application. The method may still further include receiving, by the first computing device, user-entered text associated with the second network-based application. The method may also include applying, by the first computing device, the set of text-entry preferences to the user-entered text associated with the second network-based application and sending, after applying the set of text-entry preferences, the user-entered text associated with the second network-based application to the server.

The method may include sending, to the server from a second computing device, a second valid login request from the user for the account and receiving, from the server, the set of text-entry preferences associated with the account. The method may also include sending, to the server, a request from the user to execute a second network-based application on the server and receiving, by the second computing device, user-entered text associated with the second network-based application. The method may further include applying, by the second computing device, the set of text-entry preferences to the user-entered text associated with the second network-based application and sending, after applying the set of text-entry preferences, the user-entered text associated with the second network-based application to the server.

The set of text-entry preferences may include one or more user-defined spelling preferences, one or more user-defined abbreviation expansion preferences and/or one or more user-defined capitalization preferences. Applying the set of text-entry preferences may include comparing the user-entered text with a list of user-specific commonly used terms included in the set of text-entry preferences and providing, based on the comparing, one or more auto-complete suggestions. The one or more auto-complete suggestions may be determined based on respective portions of the user-entered text matching corresponding portions of the provided auto-complete suggestions.

The method may include receiving, by the computing device, a request from the user to execute a locally-installed application and receiving, by the computing device, user-entered text associated with the locally-installed application. The method may also include applying, by the computing device, the set of text-entry preferences to the received user-entered text and providing, after applying the set of text-entry preferences, the received user-entered text to the locally-installed application.

In another general aspect, a system includes at least one processing device and at least one non-transient, machine-readable medium having instructions stored thereon. The instructions, when executed by the at least one processing device, cause the system to provide for receiving a valid login request from a user for an account maintained on the server and identifying, in the system, a set of text-entry preferences associated with the account. The instructions, when executed, further provide for receiving a request from the user to execute a first network-based application on the server and receiving user-entered text associated with the first network-based application. The instructions, when executed, further provide for applying, the set of text-entry preferences to the received user-entered text and providing, after applying the set of text-entry preferences, the received user-entered text to the first network-based application.

In another general aspect, a computing device includes at least one processing device and at least one non-transient, machine-readable medium having instructions stored thereon. The instructions, when executed by the at least one processing device, cause the computing device to provide for sending, to a server, a valid login request from a user for an account maintained on the server and receiving, from the server, a set of text-entry preferences associated with the account. The instructions, when executed, further provide for sending, to the server, a request from the user to execute a first network-based application on the server and receiving user-entered text associated with the first network-based application. The instructions, when executed, still further provide for applying the set of text-entry preferences to the user-entered text and sending, after applying the set of text-entry preferences, the user-entered text to the server.

DETAILED DESCRIPTION

Figure 1:
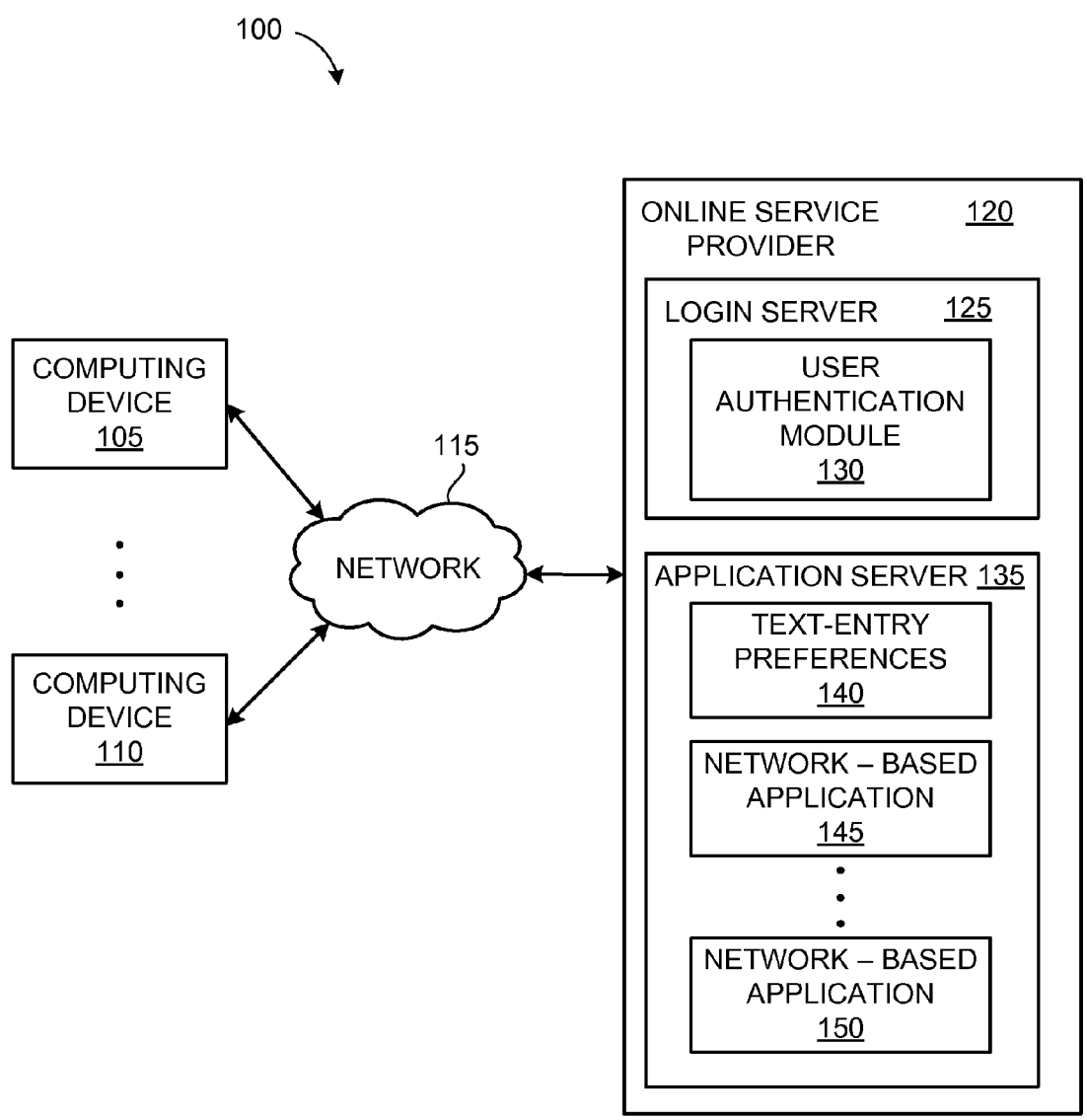
FIG. 1 is a block diagram illustrating a computing network in accordance with an example embodiment.

FIG. 1 is a block diagram illustrating a computing network 100 in accordance with an example embodiment. The computing network 100 may be used implement approaches for network-based application of text-entry preferences (such as custom spellchecking, custom abbreviation expansion, custom capitalization and providing auto-complete suggestions using terms frequently used by a particular user). Such text-entry preferences may be applied using the techniques described herein, such as described with respect to the other figures of this disclosure. The configuration of the computing network 100 is provided for purposes of illustration and by way of example. It will be appreciated that other computing network configurations and other approaches for implementing the techniques described herein are possible.

As shown in FIG. 1, the computing network 100 includes a plurality of computing devices that include the computing device 105 and the computing device 110. While only two computing devices are shown in FIG. 1, the computing network 100 may include additional computing devices. In the computing network 100, the computing devices 105 and 110 may communicate with an online service provider 120 via a data network 115. The online service provider 120 may include one or more computing servers. The particular configuration of the online service provider 120 may depend on the particular embodiment. The data network 115 may be a private network data network or may be a public data network, such as the Internet, for example.

In the embodiment shown in FIG. 1, the online service provider 120 includes a login server 125 and an application server 135. The login server 125 includes a user authentication module 130, which may be configured to receive a login request from a user (e.g., a login request from the computing device 105 via the data network 115) and determine whether or not that login request is valid. For instance, the user authentication module 130 may determine whether a received login request is valid or not by comparing user credentials that are included in the login request with user credentials for user accounts that are maintained by the online service provider 120. In such an embodiment, if the received user credentials match those for a given user account, the user who provided those credentials may be granted access to the corresponding account on the online service provider 120.

The online service provider 120 of the computing network 100 also includes an application server 135. As shown in FIG. 1, the application server 135 may include text entry preferences 140 and a plurality of network-based applications, such as a network-based application 145 and a network-based application 150. While only two network-based applications are shown in FIG. 1, it will be appreciated that the application server may include additional network-based applications, depending on the particular embodiment. The network-based applications 145 and 150 may take a number of forms. For instance, the network based applications 145 in 150 may include an e-mail application, a word processing application, a database management application or a number of other network-based applications.

In other embodiments, the login server 125 and the application server 135 may be implemented as a single entity or, alternatively, may be implemented using additional server devices. The computing network 100 may be used, such as using the techniques described herein, to apply the text-entry preferences 140 to text entered by a user of the computing devices 105 and/or 110, such as text entered in association with the network-based applications 145 in 150 or with applications that are locally installed on the computing devices 105 and 110 such as described herein.

Figure 2:
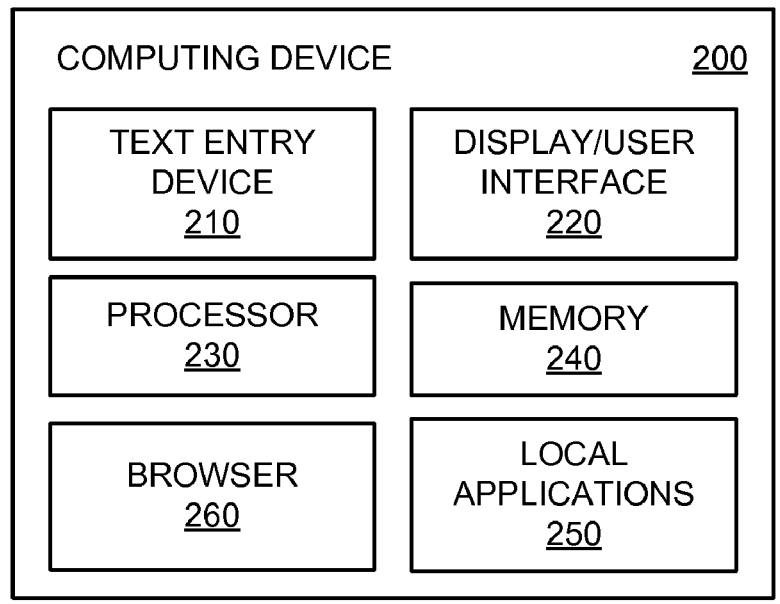
FIG. 2 is a block diagram of a computing device in accordance with an example embodiment that may be implemented in the computing network of FIG. 1.

FIG. 2 is a block diagram of a computing device 200 in accordance with an example embodiment that may be implemented as the computing devices 105 and 110 in the computing network 100 of FIG. 1. As shown in FIG. 2, the computing device 200 includes a text entry device 210, a display/user interface (UI) 220, a processor 230, memory 240, local applications 250 and a browser 260. The configuration of the computing device 200 shown in FIG. 2 is given by way of example, and it will be appreciated that a number of other configurations are possible.

In the computing device 200 the text entry device 210 may comprise, as some examples, a keyboard, a touchscreen text entry device and/or a speech recognition text entry device. The text entry device 210 may be used to receive user-entered text when implementing the techniques described herein for applying text-entry preferences. The display/UI 220 of the computing device 200 may be used to display information to a user for interacting with one or more applications, such as network-based applications and or locally-installed applications (e.g., the local applications 250). Using the techniques described herein, a single set of text-entry preferences, such as those described herein, may be used across multiple applications and/or across multiple computing devices, which would eliminate the need to recreate such preferences for each application and each computing device that a user interacts with.

In the computing device 200, the processor 230 may be configured to execute machine-readable instructions that are stored in the memory 240, included in the local applications 250 and/or included in the browser 260 when implementing the techniques described herein. Depending on the particular embodiment, the instructions of the local applications 250 and the browser 260 may also be stored in the memory 240, though other approaches are possible.

Figure 3:
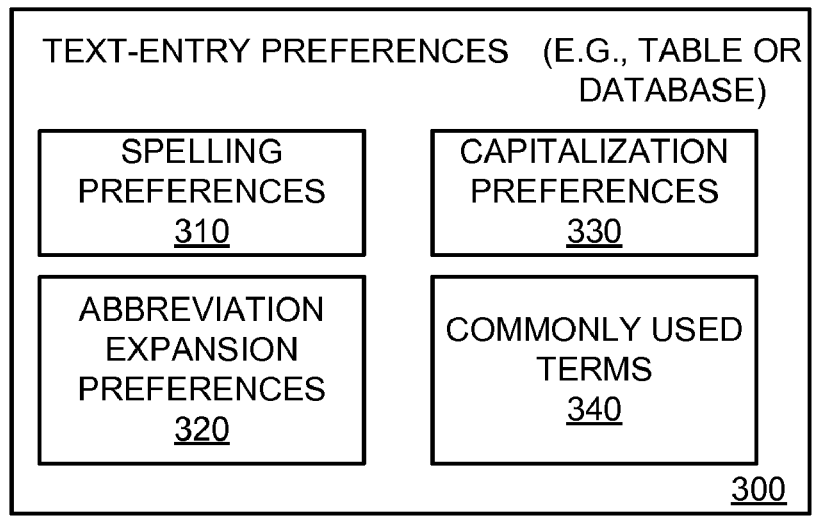
FIG. 3 is a block diagram illustrating text-entry preferences in accordance with an example embodiment.

FIG. 3 is a block diagram illustrating text-entry preferences 300 in accordance with an example embodiment. The text-entry preferences 300 may be stored in a computing device, such as the computing device 200, in a number of fashions. For instance, the text-entry preferences 300 may be stored in the memory 240 of the computing device 200 as a table and/or as a database. In other embodiments, the text-entry preferences 300 may be stored in a computing device using other appropriate techniques.

As illustrated in FIG. 3, the text entry preferences 300 may include user-defined spelling preferences 310, user-defined abbreviation expansion preferences 320, user-defined capitalization preferences 330 and user specific commonly used terms 340. In an example embodiment, a computing device, such as the computing device 200, or a server, such as the online service provider 120, may be configured to provide a user interface on a user's computing device that the user may use to add and/or remove items from the user-defined spelling preferences 310, the user-defined abbreviation expansion preferences 320, the user-defined capitalization preferences 330 and the user-specific commonly used terms 340.

In the text-entry preferences 300, the user-defined spelling preferences 310 may include one or more words, or terms that may not be found in a standard dictionary. These may be, for example, proper names, technical jargon, or other terms a user wishes to indicate as being properly spelled, even though they are not listed in a standard dictionary. The user-defined abbreviation expansion preferences 320, may include a list of abbreviations and respective text that the user wishes to be replaced for the abbreviations when the abbreviation text is entered using, for example, the text entry device 210 of the computing device 200. As an example, a user may define an expansion preference that indicates the text "ty" or "TY", when entered by the user, should be expanded to the text "thank you." The user-defined capitalization preferences 330 may similarly include a list of terms with user-defined capitalization that, using a standard grammar checker, for example, may be marked as improperly capitalized. For instance, a user may add his or her name in all lowercase or all uppercase letters to the user-defined capitalization preferences 330. The commonly used terms 340 may include a list of terms which are frequently used by a user that may then be used as auto-complete suggestions, such as using the techniques described herein.

Figure 4A:
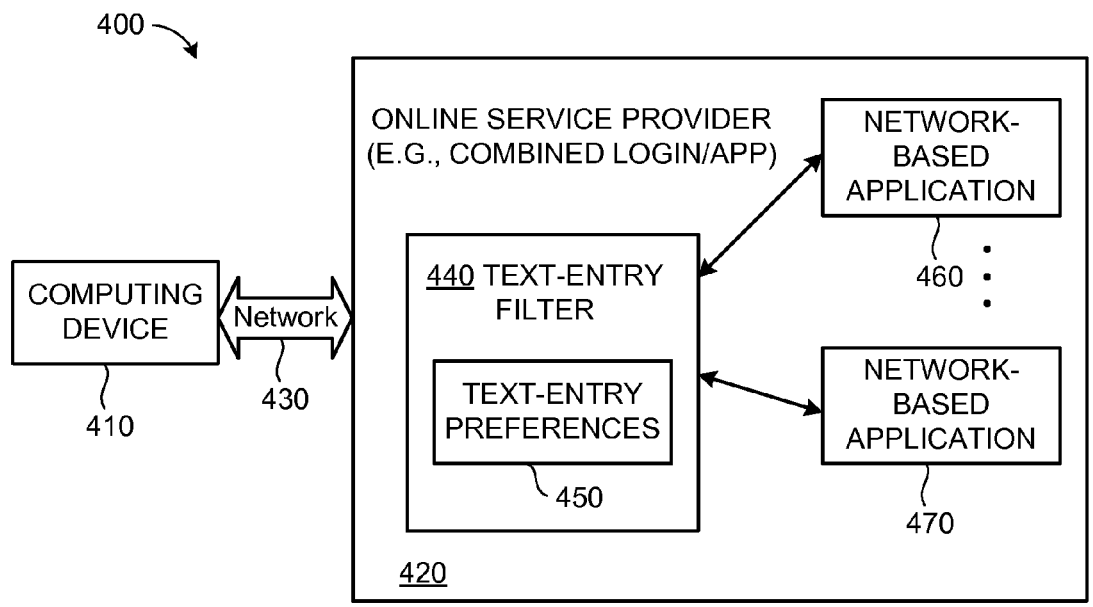
FIGS. 4A and 4B are block diagrams illustrating approaches for implementing network-based text-entry preferences in accordance with example embodiments.
Figure 4B:
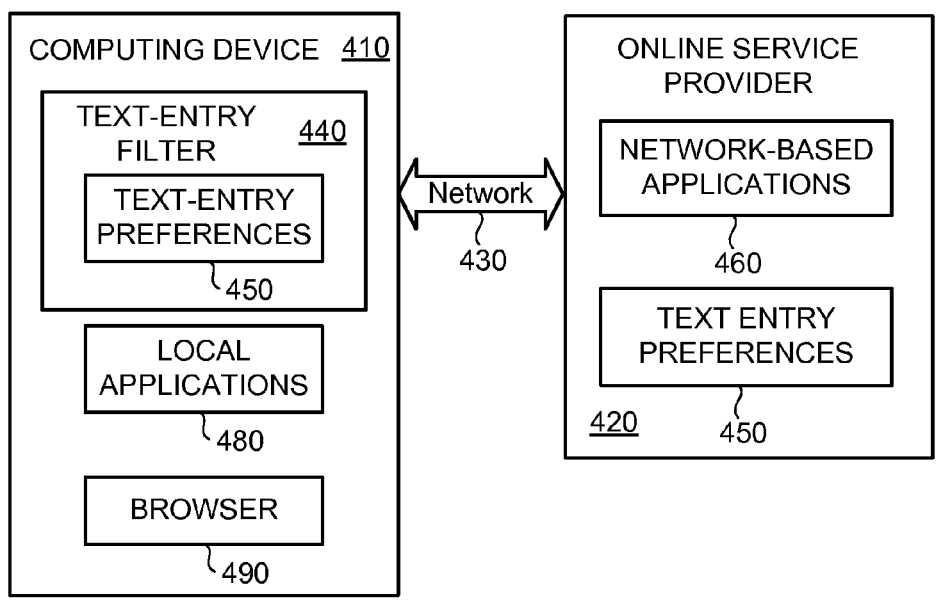

FIGS. 4A and 4B are block diagrams of two configurations of a computing network 400, which illustrate two approaches that may be used for implementing (applying) network-based text-entry preferences to user-entered text in accordance with example embodiments. As shown in FIGS. 4A and 4B, the computing network 400 includes a computing device 410, an online service provider 420 and a data network 430. As indicated in FIG. 4A, the online service provider 420 in the computing network 400 may be implemented as a combined login server and application server, such as in like fashion as was previously discussed with respect to FIG. 1.

Referring still to FIG. 4A, the online service provider 420 includes a text-entry filter 440 that may be used to apply text-entry preferences 450. In an example embodiment, the text-entry preferences 450 may be implemented in similar fashion as the text-entry preferences 300 illustrated in FIG. 3. As discussed in further detail below with respect to FIGS. 5A, 5B, 5C and 6, for example, the text-entry filter 440 may be used to apply the text entry preferences 450 to text that is entered by a user using the computing device 410, where the user-entered text may be associated with a network-based application 460 or a network-based application 470, for example. In other embodiments, the text-entry filter 440 may apply the text-entry preferences 450 to text that is associated with other network-based applications, or is for other purposes.

Referring now to FIG. 4B, the computing device 410, in this configuration of the computing network 400, includes the text-entry filter 440 that may be used to apply the text-entry preferences 450 to user-entered text that is received by the computing device 410. In an example embodiment, the text-entry preferences 450 may be implemented in similar fashion as the text-entry preferences 300 illustrated in FIG. 3. In the particular embodiment shown in FIG. 4B, the text-entry preferences 450 may be provided to the computing device 410 in response to a valid login request being received by the online service provider 430.

As is discussed in further detail below with respect to FIGS. 7A, 7B, 7C, 7D and 8, for example, and was indicated above, the text-entry filter 440 in the computing device 410 of FIG. 4B may be used to apply the text entry preferences 450 to text entered by a user using the computing device 410, where the user-entered text may be associated with a network-based application 460, a locally-installed application 440, or a browser 490, as some examples. In other embodiments, the text-entry filter 440 may apply the text-entry preferences 450 to user-entered text that is for use with other entities, or is for other purposes.

Figure 5A:
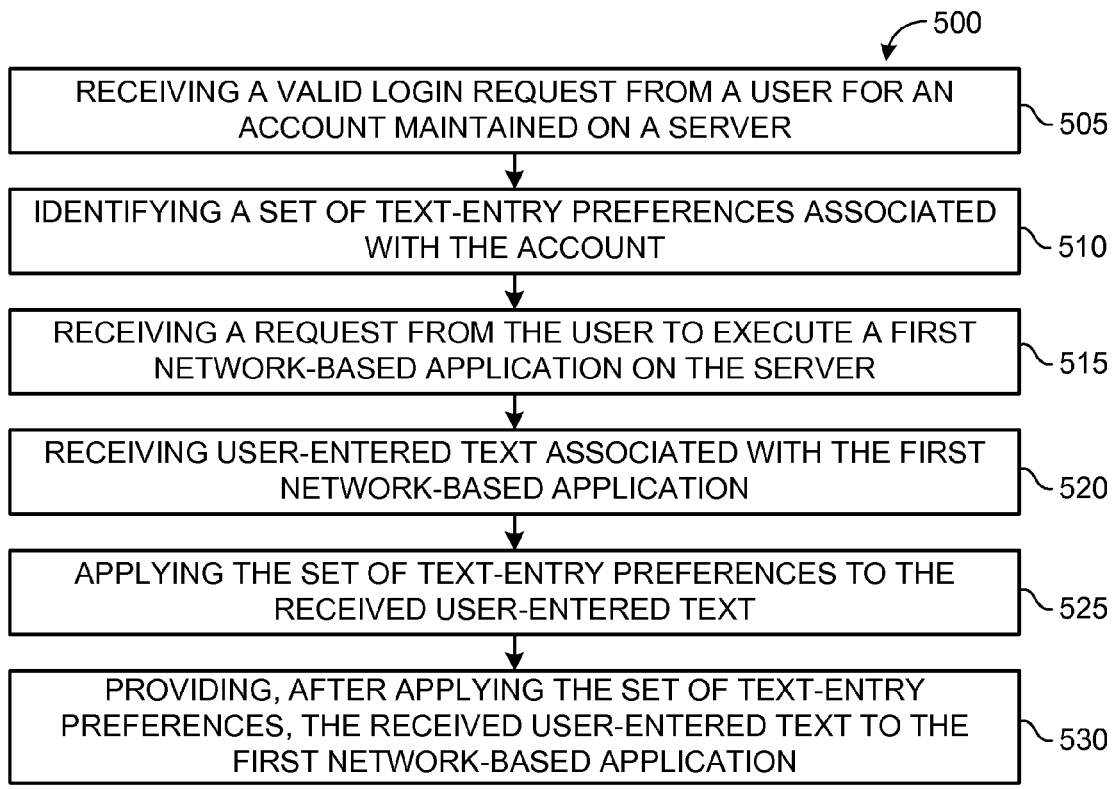
FIGS. 5A, 5B and 5C are flowcharts illustrating methods for implementing network-based text-entry preferences in accordance with example embodiments.
Figure 5B:
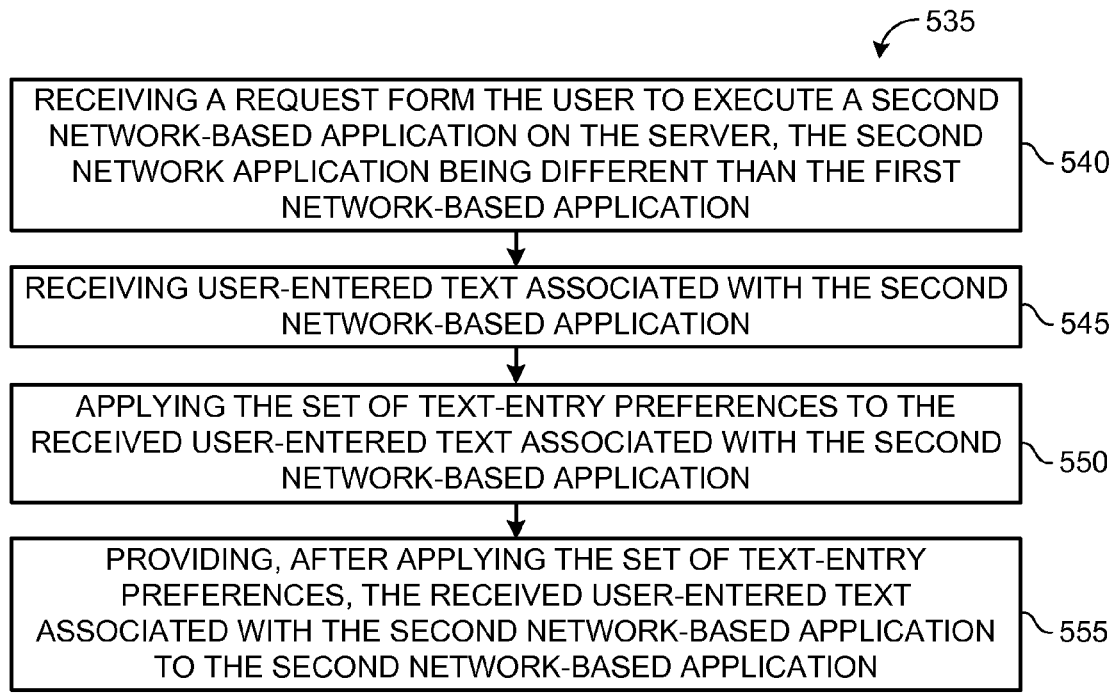
Figure 5C:
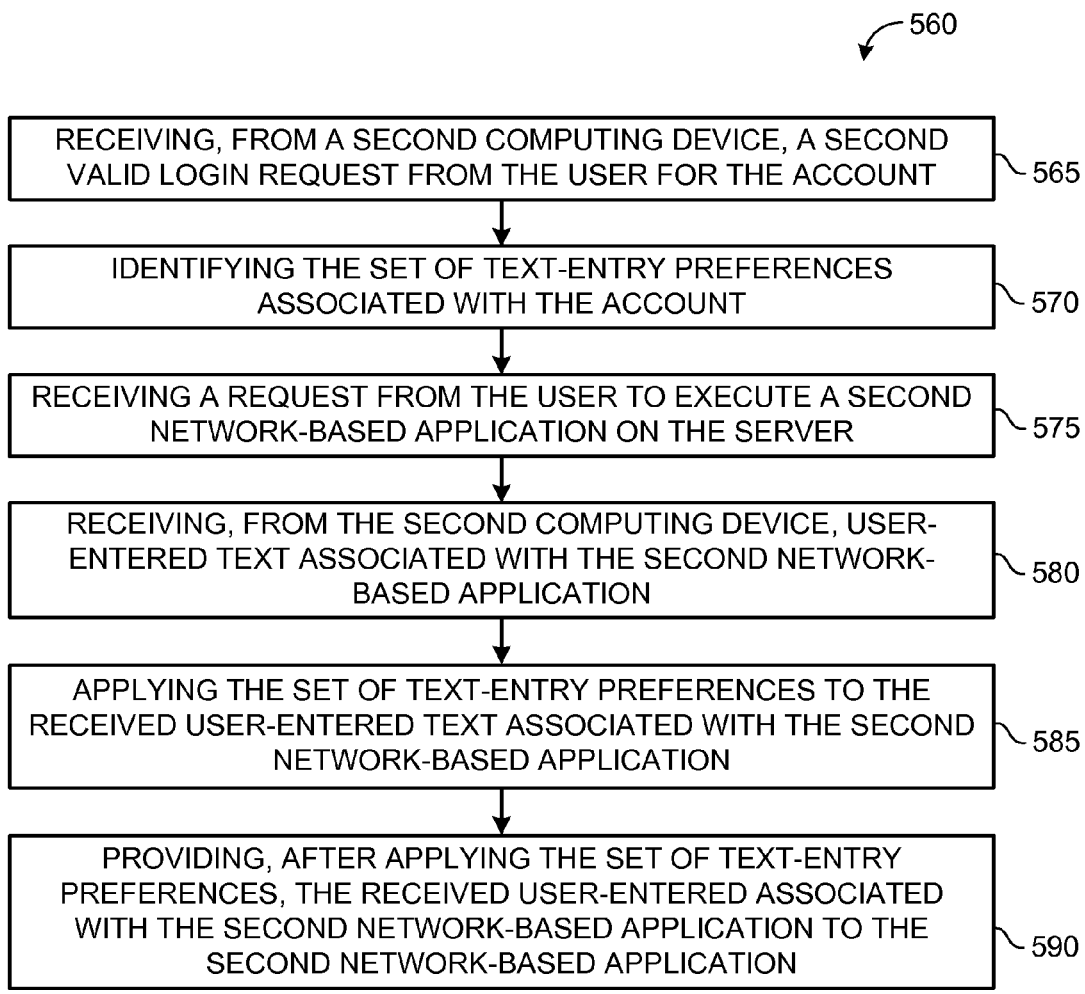

FIGS. 5A, 5B and 5C are flowcharts illustrating, respectively, methods 500, 535 and 560 for implementing network-based text-entry preferences in accordance with example embodiments. The methods 500, 535 and 560 may be implemented in the computing network 100 illustrated in FIG. 1, or in the computing network 400 illustrated in FIG. 4A using the approaches illustrated in FIGS. 2 and 3 and discussed above. Accordingly, the methods 500, 535 and 560 will be described with further reference to FIGS. 1, 2, 3 and 4A, as appropriate. It will be appreciated, however, that the methods 500, 535 and 560 may be implemented in networks having other configurations using other suitable techniques.

Referring now to FIG. 5A, the method 500 includes, at block 505, receiving a valid login request from a user for an account maintained on a server. For instance, such a login request may be sent from the computing device 105 to the login server 125 of the online service provider 120 via the network 115. As discussed above, the user authentication module 130 of the login server 125 may process the login request and authenticate the user to access a corresponding account maintained by the online service provider 120.

At block 510, the method 500 includes identifying a set of text-entry preferences associated with the user account. For example, in the network 100, after the login server 125 authenticates the user, the online service provider 120 may identify the text-entry preferences 140 that are stored on the application server 135. In other embodiments, the text-entry preferences 140 may be stored elsewhere, such as on the login server 125, or may be stored on a combined login/application server, such as in the online service provider 420 shown in FIGS. 4A and 4B, as some examples. In other embodiments, the text-entry preferences 140 may be stored in other locations.

At block 515, the method 500 includes receiving a request from the user to execute a first network-based application on the server. For instance the request of block 515 may be sent from the computing device 105 to the application server 135 via the network 115. This request may indicate that the user wishes to run the network-based application 145 or the network-based application 150. As was discussed above, such a network-based application may communicate with a user computing device (e.g., over a data network) when executing in order to provide a corresponding UI for the application on the computing device. The user may then use the provided UI to interact with the associated network-based application, such as to enter text or other information.

The method 500 further includes, at block 520 receiving user-enter text associated with the first network-based application. For instance, the user may request execution of the network-based application 145, which may be, for example, a network-based e-mail program. The user may then use a UI of the network-based application 145 on the computing device 105 to enter text associated with the e-mail application, such as for composing an e-mail message.

After receiving the user-entered text at block 520, the method 500 includes, at block 525, applying the set of text-entry preferences identified at block 510 to the received user-entered text, such as using the approaches described herein. For instance, in the example embodiment shown in FIG. 4A, text-entry preferences 450 may be applied to user-entered text by the text-entry filter 440.

At block 530, the method 500 includes providing, after applying the set of text-entry preferences, at block 525, the received user-entered text to the first network-based application. For example, the text entry filter 440 may provide the user-entered text to the network-based application 460 (or the network based application 145 in the network 100) after applying the text-entry preferences 450. The first network-based application may then use the received user-enter texted as appropriate for the particular network-based application. For instance, the user-entered text may be included in an e-mail message, with any changes or modifications made at block 525 being reflected in that text.

The method 535 illustrated in FIG. 5B may be implemented in conjunction with the method 500 illustrated in FIG. 5A. In an embodiment implementing such an approach, the method 535 includes, at block 540 receiving a request from the user to execute a second network-based application on the server. In the method 535, the second network application is different than the first network application of block 515. For instance in the network 400 illustrated in FIG. 4A, the first network-based application of block 515 may be the network-based application 460 (e.g., an e-mail application), while the second network-based application of block 540 may be the network-based application 470 (e.g., a word processing application).

At block 545, the method 535 may include receiving user-entered text associated with the second network-based application of block 540, such as text to be included in a word processing document. At blocks 550 and 555, the method 535 may include, in similar fashion as discussed above with respect to blocks 525 and 530 of the method 500, applying (at block 550) the set of text-entry preferences to the received user-entered text associated with the second network-based application and providing (at block 555) the user-entered text to the second network-based application after applying the text-entry preferences. In the above example, the user-entered text of block 555 may then be included in a word processing document with any changes or modifications made at block 550 being reflected in that text. Using such an approach, the same text-entry preferences may be used with multiple applications (e.g., network-based applications), thus preventing the need to create separate text-entry preferences for each application.

In like fashion as the method 535, the method 560 illustrated in FIG. 5C may also be implemented in conjunction with the method 500 illustrated in FIG. 5A. In an embodiment implementing such an approach, the method 560 includes, at block 565 receiving (e.g., at the login server 125 or the online server provider 420) a second valid login request from the user for the user's account. In such an approach, the valid login request of block 505 of the method 500 may be received from a first computing device, such as the computing device 105, while the second valid login request of block 565 may be received from a second computing device, such as the computing device 110 in the network 100. As discussed herein, the user may then be granted access to his or her account after authentication of the second valid login request of block 565.

In the method 560, the operations of blocks 570-590 may be implemented in similar fashion as blocks 510-530 of the method 500. For instance, at block 570, a set of text-entry preferences may be identified. At block 575, a request to execute a second network-based application may be received at the server. In the method 560, the second network-based application may be the same network-based application as the first network-based application of block 515, or may be a different network-based application. At block 580, user-entered text associated with the second network-based application may be received. At block 585, the set of text-entry preferences identified at block 570 may be applied to the user-entered text received at block 580. At block 590, the user-entered text of block 585 may be provided to the second network-based application after applying the set of text-entry preferences, in like fashion as described above with respect to block 530 of the method 500, for example.

Figure 6:
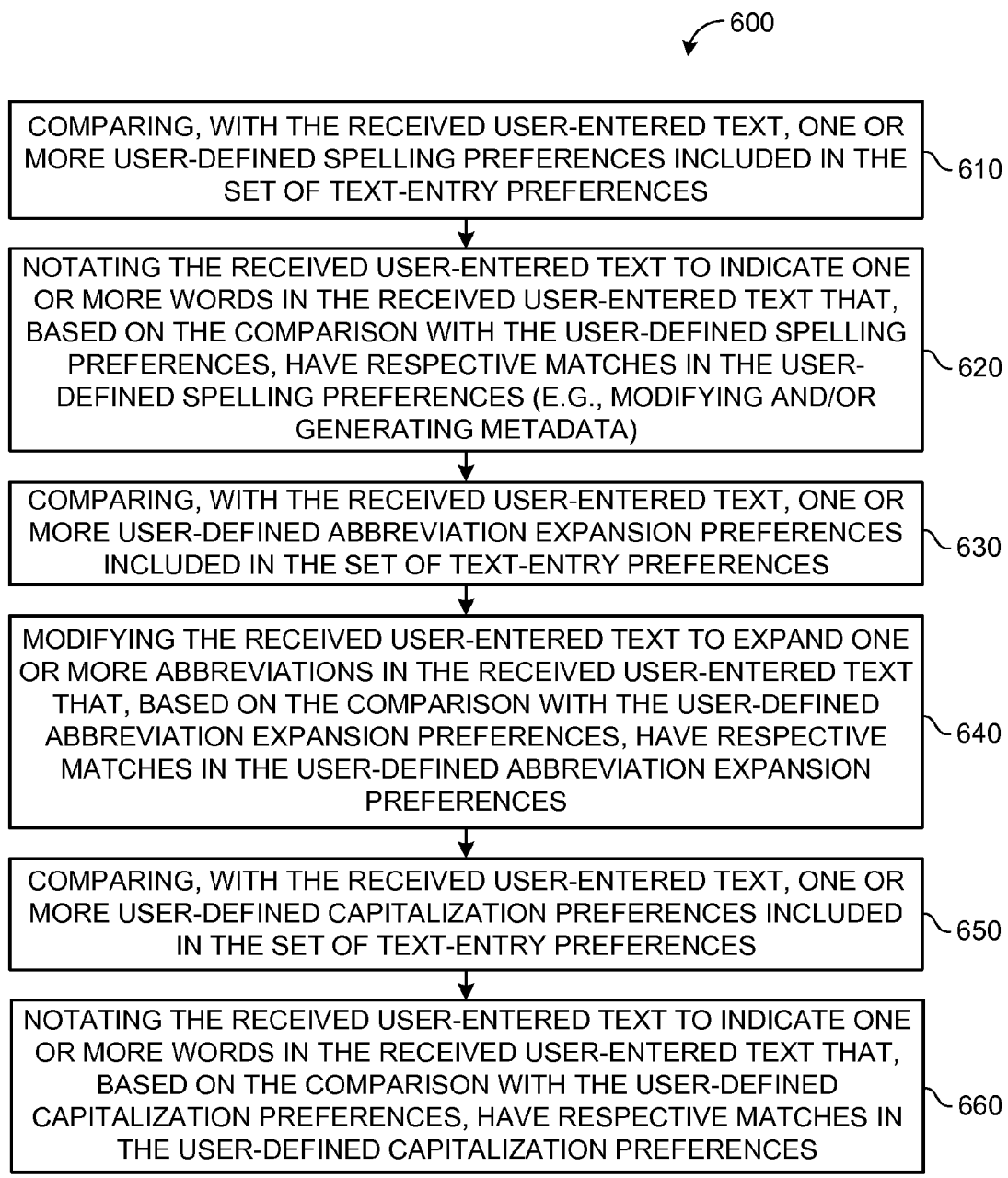
FIG. 6 is a flowchart illustrating a method for applying text-entry preferences in accordance with an example embodiment.

FIG. 6 is a flowchart illustrating a method 600 for applying text-entry preferences in accordance with an example embodiment. The method 600 may be implemented in conjunction with the methods 500, 535 and 560 illustrated, respectively, in FIGS. 5A, 5B and 5C. For example, the method 600 may be implemented as block 525 of the method 500, block 550 of the method 535 and block 585 of the method 560. Of course, a number of other appropriate approaches may be used for applying text-entry preferences in these methods. For purposes of illustration, the method 600 will be described as being implemented as block 525 of the method 500. Further, the method 600 may be implemented using the techniques and approaches illustrated in FIGS. 1, 2, 3, 4A and 4B. For instance, the operations of the method 600 may be implemented by the text entry filter 440. Accordingly, the method 600 will be described with further reference to those figures, as appropriate. It will be appreciated, however, that the method 600 may be implemented using other approaches and techniques.

At block 610, the method 600 includes comparing the received user-entered text received at block 520 with one or more user-defined spelling preferences that are included in the set of text-entry preferences identified at block 510. As discussed briefly above, the user-defined spelling preferences may include one or more words that may not be found in the standard dictionary. As some examples, the user-defined spelling preferences may include a user's family name, terms associated with a specific profession or technology and/or alternative spellings of words that are used by the user, where the words or terms in the user-defined spelling preferences may not appear in a standard dictionary, and if not included in the set of text-entry preferences, may be marked as misspelled by the first network based application of block 515. Of course, other examples of terms that may be included in the user-defined spelling preferences are possible and the foregoing examples are provided merely for purposes of illustration. In such approaches, the text filter 440 may be configured to allow the user to add terms to such user defined spelling preferences and save those terms in the text-entry preferences 450, for example.

At block 620, the method 600 includes notating (e.g., by the text filter 440) the received user entered text to indicate one or more words in the received user-entered text that have respective matches in the user-defined spelling preferences. In the method 600, notating the received user-entered text at block 620 may include modifying the user-entered text to identify the one or more words that have respective matches in the user-defined spelling preferences.

In one embodiment, the received user-entered text may be modified, at block 620, using flags to indicate words that have respective matches in the user-defined spelling preferences. In other embodiments, the text filter 440 may generate a corresponding set of metadata for the received user-entered text, where the metadata indicates words in the user-entered text that have respective matches in the user-defined spelling preferences. Such approaches, the metadata may be provided to the first network-based application along with the user-entered text at block 530. The modifications and/or metadata may be used by the first network-based application of the method 500 to indicate that the one or more words having respective matches in the user-defined spelling preferences should not be indicated as being misspelled, even if those words do not have matches in a standard dictionary that may be used by the first network-based application to perform standard spellchecking.

At block 630, the method 600 includes comparing the received user-entered text of block 520 with one or more user-defined abbreviation expansion preferences that may be included in the set of text-entry preferences 450. At block 640, the method 600 includes modifying the received user-entered text to expand one or more abbreviations in the received user-entered text that have respective matches in the user-defined abbreviation expansion preferences. For example, a user may have added (defined) an abbreviation expansion preference in the set of text entry preferences 450 that indicates the user wants to expand the text "br" or "BR" to "Best regards." In such an approach, the user may add abbreviation expansion preferences by using an interface provided by the text filter 440, or by using a number of other appropriate mechanisms. In this example, at block 640, the text filter 440 may apply such user-defined abbreviation expansion preferences to the user-entered text, where the text filter 440 replaces the abbreviation text with its respective user-defined abbreviation expansion preference in the received user-entered text.

At block 650, the method 600 includes comparing the received user-entered text with one or more user-defined capitalization preferences that may be included in the set of text-entry preferences. For example, the user may wish to sign correspondence using all lowercase or uppercase letters. Such preferences may be added to the set of text-entry preferences by the user using the techniques described herein.

At block 660, the method 600 includes notating (e.g., by the text filter 440) the received user-entered text to indicate one or more words or terms in the received user-entered text that have respective matches in the user-defined capitalization preferences. In the method 600, notating the received user-entered text at block 660 may include modifying the user-entered text to identify the one or more words that have respective matches in the user-defined capitalization preferences and/or generating metadata, such as in similar fashion as was discussed above with respect to the user-defined spelling preferences of block 620. The modifications and/or metadata may be used by the first network-based application of the method 500 to indicate that the one or more words having respective matches in the user-defined capitalization preferences should not be indicated as being improperly capitalized, even if those words do not have matches in a standard dictionary used by the first network-based application to perform standard spellchecking and/or capitalization checking.

FIGS. 7A, 7B, 7C and 7D are flowcharts illustrating, respectively, methods 700, 720, 730 and 750 for implementing network-based text-entry preferences in accordance with example embodiments. The methods 700, 720, 730 and 750 may be implemented in the computing network 100 illustrated in FIG. 1, or in the computing network 400 illustrated in FIG. 4B, such as using the approaches illustrated in FIGS. 2 and 3 and discussed above. Accordingly, the methods 700, 720, 730 and 750 will be described with further reference to FIGS. 1, 2, 3, and 4B, as appropriate. It will be appreciated, however, that the methods 700, 720, 730 and 750 may be implemented in networks having other configurations using other suitable techniques. The methods 700, 720, 730 and 750 include similar operations to the methods 500, 535 and 560. However, in the methods 700, 720, 730 and 750 (e.g., in the network 400 illustrated in FIG. 4B) text-entry preferences are applied by the text-entry filter 440 using the computing device 410 (e.g., client side) rather than the online service provider server 420 (network side).

Figure 7A:
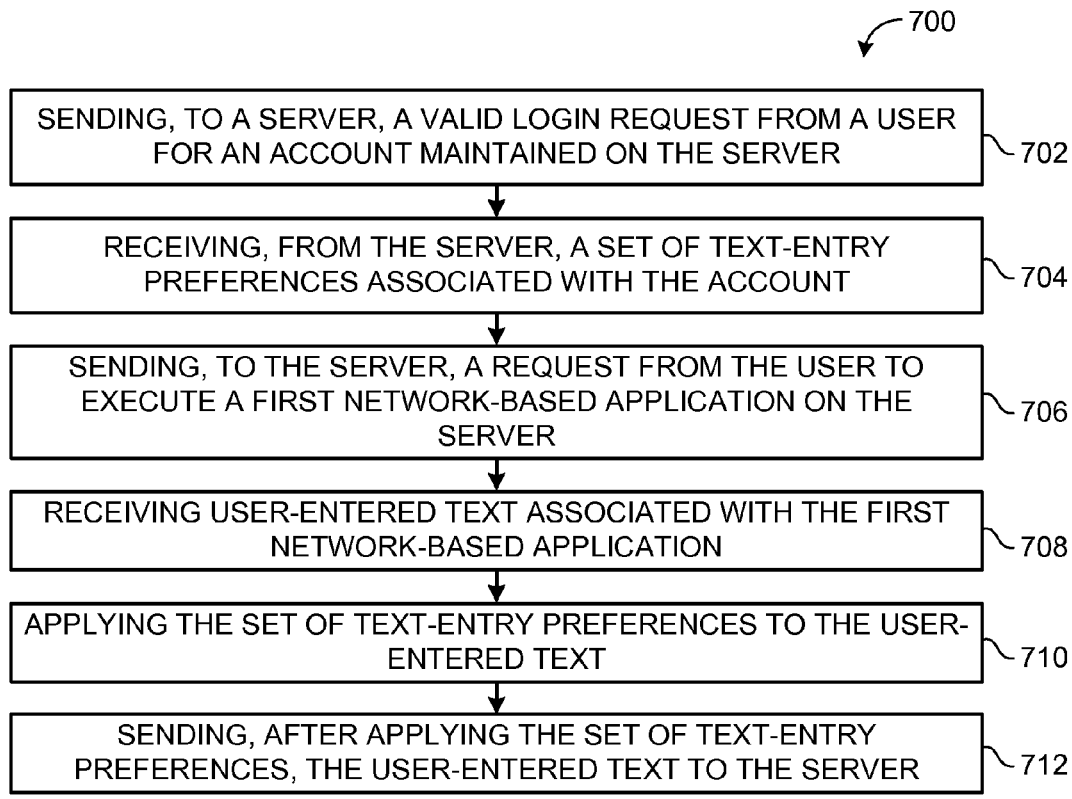
FIGS. 7A, 7B and 7C, and 7D are flowcharts illustrating methods for implementing network-based text-entry preferences in accordance with example embodiments.

Referring now to FIG. 7A, the method 700 includes, at block 702, sending, to a server, a valid login request from a user for an account maintained on the server. For instance, such a login request may be sent from the computing device 410 to the combined login/application server of the online service provider 420 via the network 430. As discussed herein, a user authentication module of the online service provider 420 may process the login request and authenticate the user for access to a corresponding account maintained by the online service provider 420.

At block 704, the method 700 includes receiving a set of text-entry preferences associated with the user account. For example, in the network 400 illustrated in FIG. 4B, after the online service provider 420 authenticates the user, the online service provider 420 may identify the text-entry preferences 450 and send those text-entry preferences 450 to the computing device 410 via the network 430. In other embodiments, the text-entry preferences 450 may be stored elsewhere and provided to the computing device 410 in other manners.

At block 706, the method 700 includes sending, to the server, a request from the user to execute a first network-based application on the server. For instance the request of block 706 may be sent from the computing device 410 to the online service provider 420 via the network 430. This request may indicate that the user wishes to run a given network-based application of the network-based applications 460. As was discussed above, such a network-based application may communicate with the user computing device 410 while it is executing in order to provide a corresponding UI for the application on the computing device 410. The user may then use the provided UI to interact with the associated network-based application, such as to enter text or other information.

The method 700 further includes, at block 708 receiving, by the computing device 410, user-entered text associated with the first network-based application. At block 710, the method 700 includes the text-entry filter 440 of the computing device 410 applying the text-entry preferences 450 to the user-entered text of block 708. At block 712, the method 700 may include sending the user-entered text to the online service provider 420 after the text-entry filter 440 has applied the text-entry preferences 450. The online service provider 420 may then use the user-entered text with the applied text entry preferences 450 in similar fashion as was discussed above with respect to the methods 500, 535 and 560.

Figure 7B:
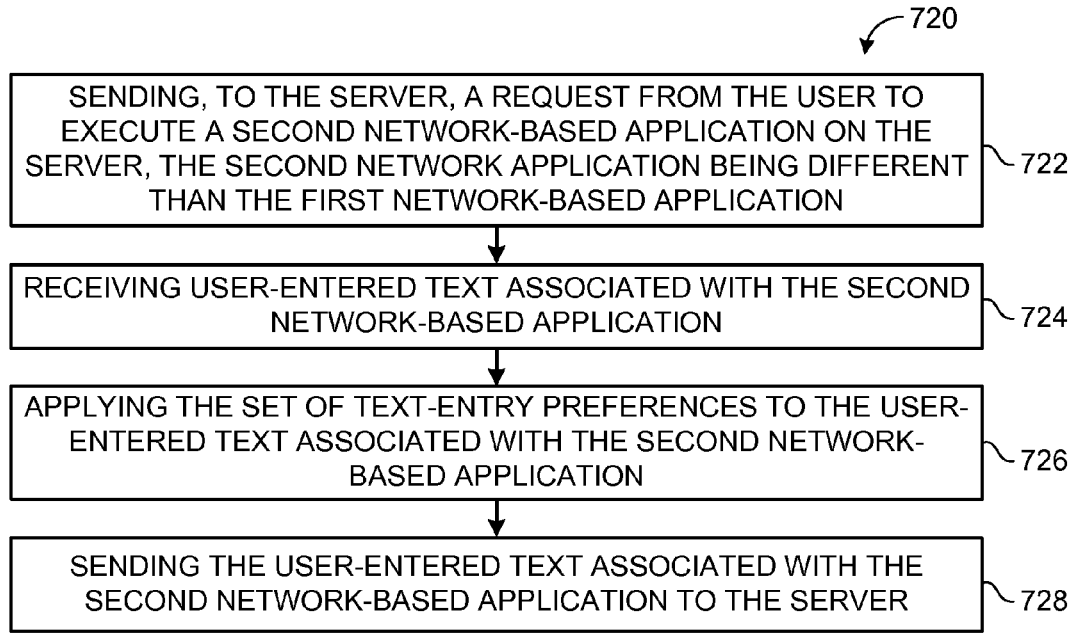

The method 720 illustrated in FIG. 7B may be implemented in conjunction with the method 700 illustrated in FIG. 7A. In an embodiment implementing such an approach, the method 720 includes, at block 722 sending, to a server a request from the user to execute a second network-based application on the server. In the method 720, the second network application may be different than the first network application of block 706. For instance, in similar fashion as discussed above with respect to FIG. 5B, the first network-based application of block 706 may be an e-mail application, while the second network-based application of block 722 may be a word processing application. In other embodiments, other network-based applications may be used.

At block 724, the method 720 may include receiving, by the computing device 410, user-entered text associated with the second network-based application of block 722, such as text to be included in a word processing document. At blocks 726 and 728, the method 720 may include, in similar fashion as discussed above with respect to blocks 710 and 712 of the method 700, applying (at block 726) the set of text-entry preferences 450 to the received user-entered text associated with the second network-based application and sending (at block 728) the user-entered text to the online service provider 420 after applying the text-entry preferences 450. The online service provider 420 may then use the user-entered text associated with the second network-based application, including the applied text entry preferences 450, in similar fashion as was discussed above with respect to the methods 500, 535 and 560. Such approaches, in like fashion as discussed above with respect to FIG. 5B, may allow for the use of a single set of text-entry preferences for multiple applications.

Figure 7C:
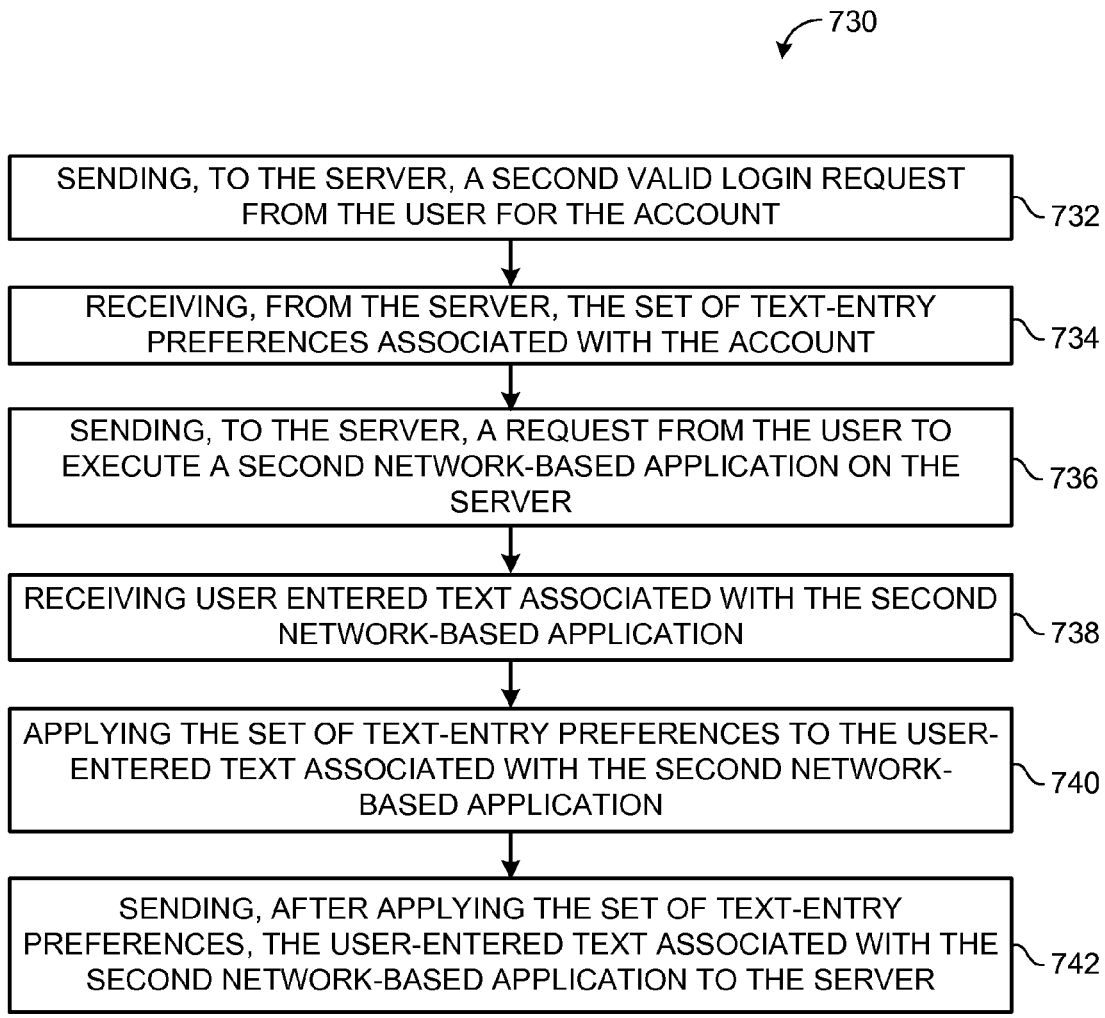

In like fashion as the method 720, the method 730 illustrated in FIG. 7C may also be implemented in conjunction with the method 700 illustrated in FIG. 7A. In an embodiment implementing such an approach, the method 730 includes, at block 732 sending a second valid login request from the user (e.g., using another computing device) for the user's account. In such an approach, the valid login request of block 702 of the method 700 may be sent from the computing device 410, while the second valid login request of block 732 may be sent from a second, different computing device (e.g., such as in the fashion discussed with respect to the computing device 110 in the network 100 with respect to FIG. 5B). As discussed herein, the user may then be granted access to his or her account after authentication of the second valid login request of block 732.

In the method 730, the operations of blocks 734-742 may be implemented in similar fashion as blocks 704-712 of the method 700. For instance, at block 734, the set of text-entry preferences 450 may be received by the second computing device from the online service provider 420. At block 736, a request to execute a second network-based application may be sent from the second computing device to the online service provider 420. In the method 700, the second network-based application may be the same network-based application as the first network-based application of block 706, or may be a different network-based application. At block 738, user-entered text associated with the second network-based application may be received by the second computing device.

At block 740, the method 730 may include a text-entry filter of the second computing device applying the text-entry preferences 450 to the user entered text of block 738. At block 742, the method 700 may include sending the user-entered text from the second computing device to the online service provider 420 after the text-entry filter has applied the text-entry preferences 450. The online service provider 420 may then use the user-entered text with the text entry preferences 450 applied to it in similar fashion as was discussed above with respect to the methods 500, 535 and 560. Such an approach allows for the use of the same text-entry preferences on multiple computing devices without the need to recreate such preferences for each device.

Figure 7D:
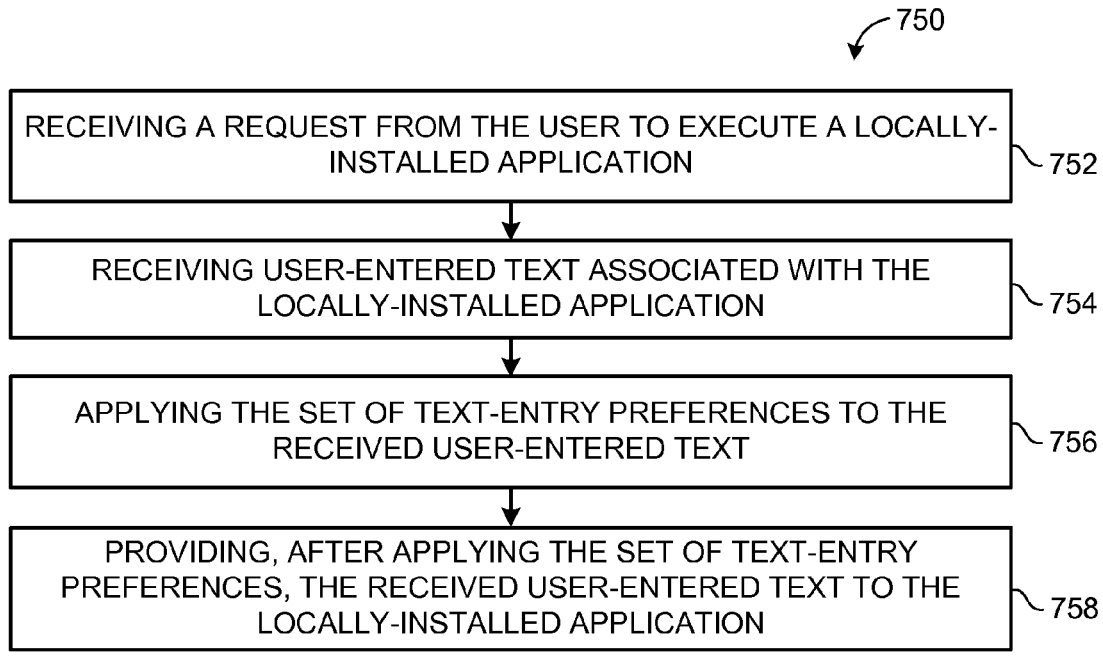

In like fashion as the methods 720 and 730, the method 750 illustrated in FIG. 7D may also be implemented in conjunction with the method 700 illustrated in FIG. 7A and will be described with further reference to the network 400 illustrated in FIG. 4B. In implementing such an approach, the method 750 may include, at block 752, receiving, by the computing device 410, a request from the user to execute a locally-installed application, such as one of the local applications 480 of the computing device 410. At block 754, the method 750 may include receiving, by the computing device 410, user-entered text associated with the requested locally-installed application 480.

At block 756, the method 750 includes applying the text-entry preferences 750 (e.g., using the text-entry filter 440) to the received user-entered text. At block 758, the method 750 includes providing the user-entered text of block 756 (with the text-entry preferences 750 applied) to the requested locally-installed application 480. In such an approach, the user-entered text with the text entry preferences 450 applied to it may be used by the locally-installed applications 480 in similar fashion as was discussed above with respect to the network-based applications of the methods 500, 535 and 560. Such approaches allow the same set of text-entry preferences to be used for both network-based applications and locally-installed applications.

Figure 8:
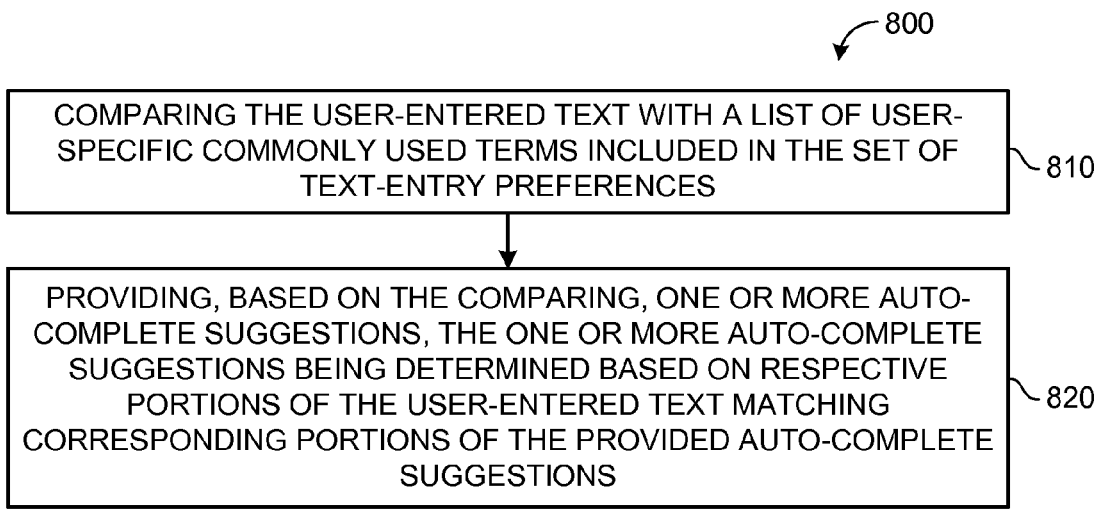
FIG. 8 is a flowchart illustrating a method for applying text-entry preferences in accordance with an example embodiment.

FIG. 8 is a flowchart illustrating a method 800 for applying text-entry preferences in accordance with an example embodiment. The method 800 may be implemented in conjunction with the methods 700, 720 and 750 illustrated, respectively, in FIGS. 7A, 7B and 7C, such as in the network 400 illustrated in FIG. 4B. For instance, the operations of the method 800 may be implemented by the text filter 440 on the computing device 410. Of course, other network configurations and approaches may be used to implement the method 800.

At block 810, the method 800 includes comparing the user-entered text with a list of user-specific commonly used terms that may be included in the set of text entry preferences 450. In such an approach, the text entry filter 440 may be configured to monitor text entry by the user and identify terms that are commonly used by a user, such as based on frequency of use or a number of times a specific term is used. Once the text entry filter 440 identifies such a commonly used term, the text entry filter 440 may be further configured to add the identified commonly used term to the text-entry preferences 450.

At block 820, based on the comparison at block 810, the method 800 includes providing one or more auto-complete suggestions, where the auto-complete suggestions are determined based on respective portions of the user-entered text matching corresponding portions of one or more of the commonly used terms (e.g., the resulting auto-complete suggestions). As an example, the user may live in Mountain View, Calif. and may commonly use the term "Mountain View" when entering text on computing devices, such as the computing device 410. For instance, the user may commonly search the Internet for locations in Mountain View using the browser 490 of the computing device 410. In this situation, the text-entry filter 440 may identify the term "Mountain View" as a commonly used term and add that term to the text-entry preferences 450. Once the term is added to the text-entry preferences 440, the method 800, at block 820, may present the term "Mountain View" to the user when the user begins to type text that matches a portion of that commonly used term. For instance, the auto-complete suggestions may be provided once the user has typed the text "Mo", as an example. In such an approach, if the user-entered text results in matches with respective portions of multiple commonly used terms listed in the text-entry preferences 450, the method 800, at block 820, may present a list of those multiple matches as alternative auto-complete suggestions.

Figure 9:
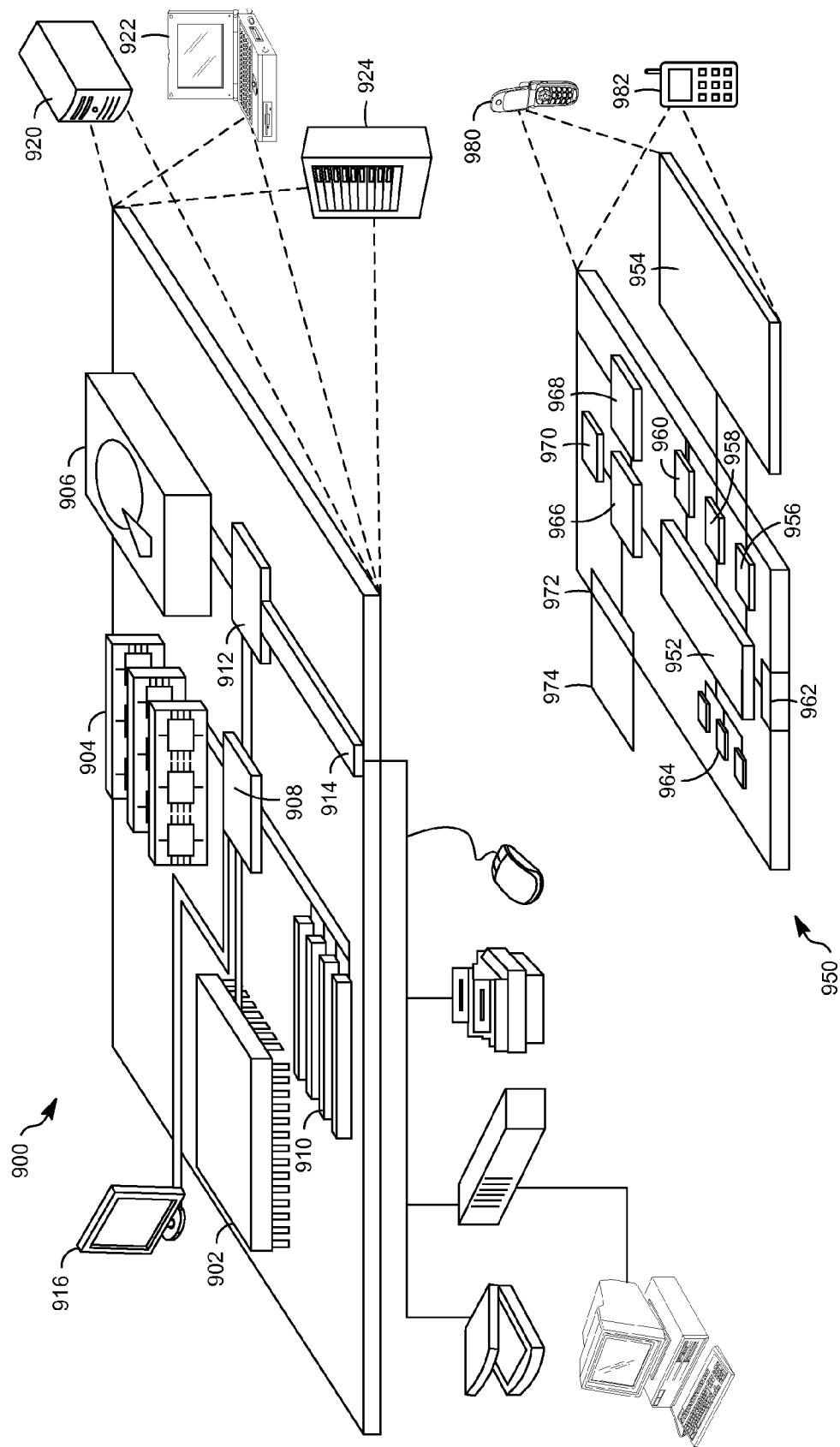
FIG. 9 is a diagram that illustrates a computing device and a mobile computing device that can be used to implement the techniques described herein in accordance with an example embodiment.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, at a server, a valid login request from a user for an account maintained on the server;
   identifying, on the server, a set of text-entry preferences associated with the account, wherein the text-entry preferences are configured for use with a plurality of network-based applications;
   receiving, at the server, a request from the user to execute a first network-based application on the server;
   receiving, from the user at the server, user-entered text associated with the first network-based application;
   applying, by the server, the set of text-entry preferences to the received user-entered text; and
   providing, after applying the set of text-entry preferences, the received user-entered text to the first network-based application.

2. The computer-implemented method of claim 1, further comprising:
   receiving, at the server, a request from the user to execute a second network-based application on the server, the second network application being different than the first network-based application;
   receiving, at the server, user-entered text associated with the second network-based application;
   applying, by the server, the set of text-entry preferences to the received user-entered text associated with the second network-based application; and
   providing, after applying the set of text-entry preferences, the received user-entered text associated with the second network-based application to the second network-based application.

3. The computer-implemented method of claim 1, wherein the set of text-entry preferences are included in one of a table and a database.

4. The computer-implemented method of claim 1, wherein applying the set of text-entry preferences comprises:
   comparing, with the received user-entered text, one or more user-defined spelling preferences included in the set of text-entry preferences; and
   notating the received user-entered text to indicate one or more words in the received user-entered text that, based on the comparison with the user-defined spelling preferences, have respective matches in the user-defined spelling preferences.

5. The computer-implemented method of claim 4, wherein notating the received user-entered text comprises modifying the received user-entered text to indicate the respective matches.

6. The computer-implemented method of claim 4, wherein notating the received user-entered text comprises generating metadata corresponding with the user-entered text, the metadata indicating the respective matches, and
   wherein the metadata is provided to the first network-based application with the user-entered text.

7. The computer-implemented method of claim 1, wherein applying the set of text-entry preferences comprises:
   comparing, with the received user-entered text, one or more user-defined abbreviation expansion preferences included in the set of text-entry preferences; and
   modifying the received user-entered text to expand one or more abbreviations in the received user-entered text that, based on the comparison with the user-defined abbreviation expansion preferences, have respective matches in the user-defined abbreviation expansion preferences.

8. The computer-implemented method of claim 1, wherein applying the set of text-entry preferences comprises:
   comparing, with the received user-entered text, one or more user-defined capitalization preferences included in the set of text-entry preferences; and notating the received user-entered text to indicate one or more words in the received user-entered text that, based on the comparison with the user-defined capitalization preferences, have respective matches in the user-defined capitalization preferences.

9. The computer-implemented method of claim 1, wherein the valid login request is received from a first computing device via a data network and the computer-implemented further comprises:
receiving, at the server from a second computing device, a second valid login request from the user for the account;
identifying, on the server, the set of text-entry preferences associated with the account;
receiving, at the server, a request from the user to execute a second network-based application on the server;
receiving, at the server from the second computing device, user-entered text associated with the second network-based application;
applying, by the server, the set of text-entry preferences to the received user-entered text associated with the second network-based application; and
providing, after applying the set of text-entry preferences, the received user-entered text associated with the second network-based application to the second network-based application.

10. The computer-implemented method of claim 9, wherein the first network-based application and the second network-based application comprise a same network-based application.

11. The computer-implemented method of claim 1, wherein the server comprises a plurality of network servers including a login server and an application server, the login server being configured to receive the valid login request and the application server being configured to receive the request to execute the first network-based application, receive the user-entered text and apply the set of text-entry preferences to the user-entered text.

12. The computer-implemented method of claim 11, wherein the set of text-entry preferences is located on the login sever.

13. The computer-implemented method of claim 11, wherein the set of text-entry preferences is located on the application server.

14. A computer-implemented method comprising:
sending, to a server from a first computing device, a valid login request from a user for an account maintained on the server;
receiving, from the server, a set of text-entry preferences associated with the account, wherein the text-entry preferences are configured for use with a plurality of applications;
receiving, by the computing device, a request from the user to execute a first application;
receiving, from the user by the first computing device, user-entered text associated with the first application;
applying, by the first computing device, the set of text-entry preferences to the user-entered text; and
providing, after applying the set of text-entry preferences, the user-entered text to the first application.

15. The computer-implemented method of claim 14, wherein the first application is a first network-based application and providing the user-entered text to the first application comprises sending the user-entered text to the server.

16. The computer-implemented method of claim 15, further comprising:
sending, to the server from the first computing device, a request from the user to execute a second network-based application on the server, the second network based application being different than the first network-based application;
receiving, by the first computing device, user-entered text associated with the second network-based application;
applying, by the first computing device, the set of text-entry preferences to the user-entered text associated with the second network-based application; and
sending, after applying the set of text-entry preferences, the user-entered text associated with the second network-based application to the server.

17. The computer-implemented method of claim 15, further comprising:
sending, to the server from a second computing device, a second valid login request from the user for the account;
receiving, from the server, the set of text-entry preferences associated with the account;
sending, to the server, a request from the user to execute a second network-based application on the server;
receiving, by the second computing device, user-entered text associated with the second network-based application;
applying, by the second computing device, the set of text-entry preferences to the user-entered text associated with the second network-based application; and
sending, after applying the set of text-entry preferences, the user-entered text associated with the second network-based application to the server.

18. The computer-implemented method of claim 14, further comprising:
sending, to the server from a second computing device, a second valid login request from the user for the account;
receiving, from the server, the set of text-entry preferences associated with the account;
receiving, by the computing device, a request from the user to execute a second application;
receiving, by the second computing device, user-entered text associated with the second application;
applying, by the second computing device, the set of text-entry preferences to the user-entered text associated with the second application; and
providing, after applying the set of text-entry preferences, the user-entered text associated with the second application to the second application.

19. The computer-implemented method of claim 18, wherein the first application and the second application each comprises one of a network-based application and a locally-installed application.

20. The computer-implemented method of claim 14, wherein the set of text-entry preferences comprises at least one of:
one or more user-defined spelling preferences;
one or more user-defined abbreviation expansion preferences; and
one or more user-defined capitalization preferences.

21. The computer-implemented method of claim 14, wherein applying the set of text-entry preferences comprises:
comparing the user-entered text with a list of user-specific commonly used terms included in the set of text-entry preferences; and
providing, based on the comparing, one or more auto-complete suggestions, the one or more auto-complete suggestions being determined based on respective portions of the user-entered text matching corresponding portions of the provided auto-complete suggestions.

22. The computer-implemented method of claim 14, further comprising:

receiving, by the computing device, a request from the user to execute a second application;

receiving, by the computing device, user-entered text associated with the second application;

applying, by the computing device, the set of text-entry preferences to the received user-entered text; and providing, after applying the set of text-entry preferences, the received user-entered text associated with the second application to the second application.

23. The computer-implemented method of claim 22, wherein the first application and the second application each comprises one of a network-based application and a locally-installed application.

24. A system comprising:

at least one processing device; and at least one non-transient, machine-readable medium having instructions stored thereon, the instructions, when executed by the at least one processing device, cause the system to provide for:

receiving a valid login request from a user for an account maintained on a server;

identifying, in the system, a set of text-entry preferences associated with the account, wherein the text-entry preferences are configured for use with a plurality of network-based applications;

receiving a request from the user to execute a first network-based application on the server;

receiving, from the user, user-entered text associated with the first network-based application;

applying, the set of text-entry preferences to the received user-entered text; and providing, after applying the set of text-entry preferences, the received user-entered text to the first network-based application.

25. A computing device comprising:

at least one processing device; and at least one non-transient, machine-readable medium having instructions stored thereon, the instructions, when executed by the at least one processing device, cause the computing device to provide for:

sending, to a server, a valid login request from a user for an account maintained on the server;

receiving, from the server, a set of text-entry preferences associated with the account, wherein the text-entry preferences are configured for use with a plurality of applications;

receiving, by the computing device, a request from the user to execute an application;

receiving, from the user, user-entered text associated with the application;

applying the set of text-entry preferences to the user-entered text; and sending, after applying the set of text-entry preferences, the user-entered text to the application.

26. The computing device of claim 25, wherein the application comprises one of a network-based application and a locally-installed application.

* * * * *

UNITED STATES PATENT AND TRADEMARK OFFICE
CERTIFICATE OF CORRECTION

PATENT NO. : 8,386,926 B1
APPLICATION NO. : 13/267723
DATED : February 26, 2013
INVENTOR(S) : Yoshimichi Matsuoka Page 1 of 1

It is certified that error appears in the above-identified patent and that said Letters Patent is hereby corrected as shown below:

On Title page, item (56), under "Other Publications", in column 2, line 1, delete "Syncronization" and insert -- Synchronization --, therefor.

In the Claims:

In column 20, line 1, in claim 16, delete "network based" and insert -- network-based --, therefor.

Signed and Sealed this
Eleventh Day of June, 2013

Teresa Stanek Rea
*Acting Director of the United States Patent and Trademark Office*